United States Patent [19]

Carroll et al.

[11] Patent Number: 5,530,618
[45] Date of Patent: Jun. 25, 1996

[54] CAPACITOR MOUNTING ASSEMBLY

[75] Inventors: Mark A. Carroll; Charles H. Payne, both of Garland, Tex.

[73] Assignee: AT&T Corp., Murray Hill, N.J.

[21] Appl. No.: 300,667

[22] Filed: Sep. 2, 1994

[51] Int. Cl.⁶ .............................. H01G 4/38; H05K 5/03
[52] U.S. Cl. ........................ 361/329; 361/519; 361/537
[58] Field of Search ................... 361/328–330, 361/517, 518–520, 535–538, 522, 541

[56] References Cited

U.S. PATENT DOCUMENTS

| | | |
|---|---|---|
| 2,043,532 | 6/1936 | Dubilier . |
| 4,616,290 | 10/1986 | Watanabe et al. ............... 361/328 |

FOREIGN PATENT DOCUMENTS

| | | | |
|---|---|---|---|
| 4093008 | 3/1992 | Japan | ............................ 361/517 |

Primary Examiner—Bot L. Ledynh
Attorney, Agent, or Firm—Alfred G. Steinmetz

[57] ABSTRACT

A capacitor mounting assembly uses a mounting assembly for mounting and aligning a plurality of DC can capacitors on a bulk power system assembly. The mounting assembly includes a metallic base member with a channel cross section having mounting flanges at the longitudinal edges with holes to allow fasteners to pass through and secure the base member to a power system assembly. A top metallic cover plate and a plastic layer cover the top surface of the base member to form a sandwich construction with the plastic layer between the two metallic surfaces. The plastic layer is a polypropylene sheet in the illustrative embodiment. The three layers have holes punched through the sandwich to accept the insertion of the can capacitors. The holes in the polypropylene sheet have flexible tabs about the inner circumference of each of the punched holes to provide interference fit support for the inserted can capacitors as well as assuring alignment of the capacitor relative to the hole and allowing sufficient resilience to allow connection of the capacitors to the bus bar connections of the power system.

5 Claims, 3 Drawing Sheets

CAPACITOR MOUNTING ASSEMBLY

FIELD OF THE INVENTION

This invention relates to apparatus for the alignment, mounting and mechanical support of large DC can capacitors in bulk power processing equipment.

BACKGROUND OF THE INVENTION

Traditionally large DC can capacitors are mounted into bulk power processing systems by using large metal mounting clamps. The clamps are usually assigned as one per capacitor and each clamp is secured by a plurality of mounting bolts and nuts to some supporting substrate associated with the bulk power processing system. Often the capacitor has a plastic covering which is subject to damage from the clamp which cuts through the covering when the mounting fasteners are tightened. This may be avoided by inserting a strip of insulation between the clamp and capacitor. But this solution incurs difficulty in properly aligning the terminal posts of the capacitors with the mating bus bars of the power system. The bus bars generally need separate supports and hence the resulting mechanical support system is complex and expensive to install.

SUMMARY OF THE INVENTION

A capacitor mounting assembly uses a mounting assembly for mounting and aligning a plurality of DC can capacitors on a bulk power system assembly. The mounting assembly includes a metallic base member. The base member is construcetd of aluminum to aviod causing heat or noise when mounted near magnetics. The base member has a channel cross section and has mounting flanges at the longitudinal edges of the channel with holes to allow fasteners to pass through and secure the base member to a power system assembly. A top metallic cover plate and a plastic layer cover the top surface of the base member to form a sandwich construction with the plastic layer positioned between the two metallic surfaces. The plastic layer is a polypropylene sheet in the illustrative embodiment.

The three layers have holes punched through the sandwich to accept the insertion of the can capacitors. The holes in the polypropylene sheet have flexible tabs about the inner circumference of each of the punched holes to provide an interference fit support for the inserted can capacitors as well as assuring alignment of the capacitor relative to the hole and allowing sufficient resilience to allow connection of the capacitors to the bus bar connections of the power system.

Alignment studs are provided on the mounting assembly to locate the bus bars relative to the terminals of the can capacitors.

DETAILED DESCRIPTION

Figure 1:
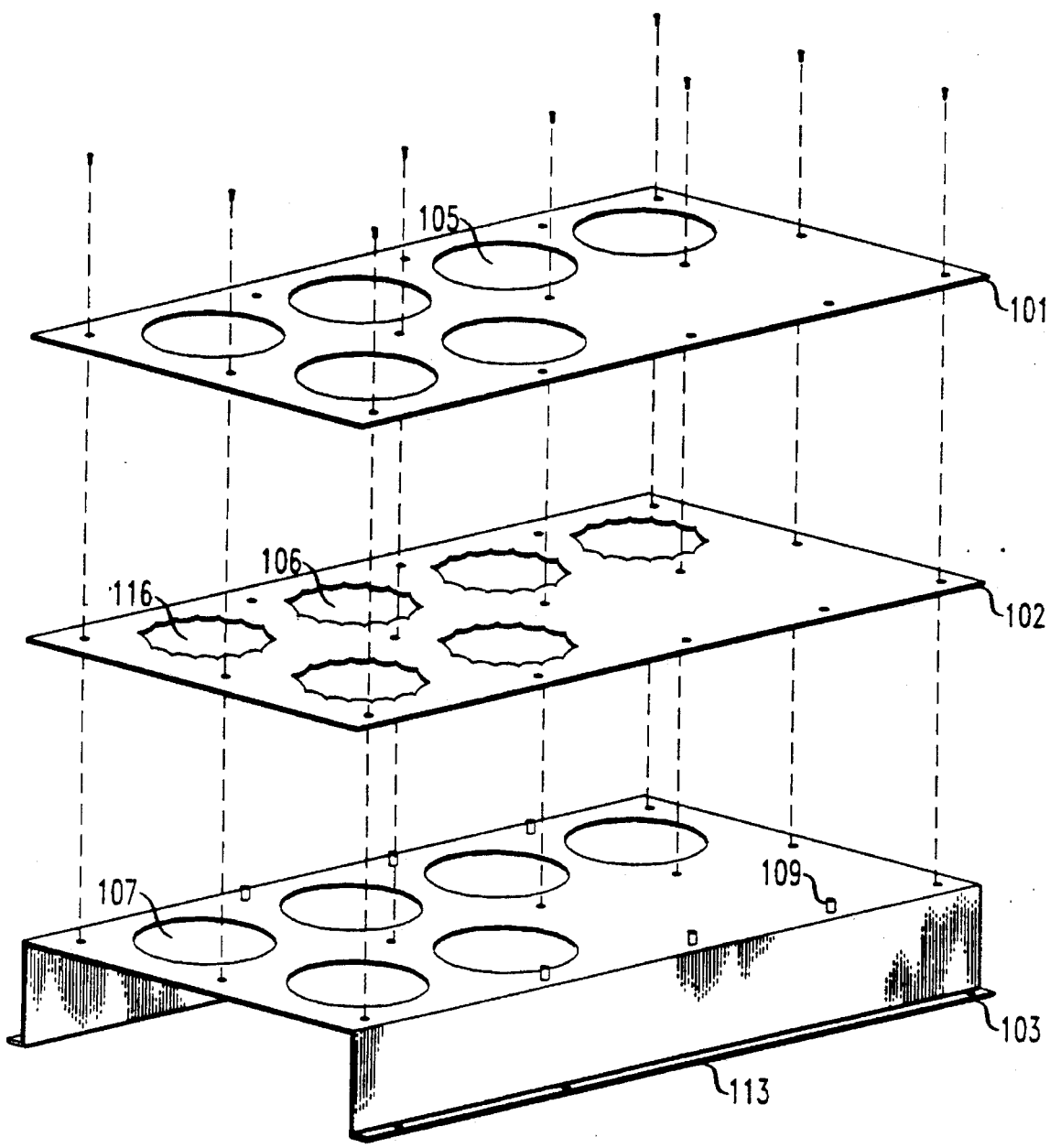
FIG. 1 is an exploded pictorial view of the capacitor mounting assembly.

The mounting assembly as shown in the exploded view of FIG. 1 is a three piece construction and includes a top planar metallic member 101, a bottom channel shaped metallic mounting member 103 and an inner flexible member 102 sandwiched between the top member 101 and the mounting member 103. Each of the members 101, 102 and 103 includes a plurality of circular apertures 105, 106 and 107 each having a diameter sized for accepting the insertion of circular can capacitors. The apertures 106 of the inner flexible member 102 have 16 tabs 116 arranged around the periphery of the aperture to provide an interference fit when a can capacitor is inserted through the apertures 106. The metallic mounting member 103 includes a plurality of mounting pem studs 109 which mate with holes in the members 102 and 101 to provide proper alignment of the three members so that the apertures 105, 106 and 107 are all in register. The mounting member 103 also includes longitudinal flanges 113 along the channel shape edge to allow fastening members to secure the mounting member to some circuit chassis.

Figure 2:
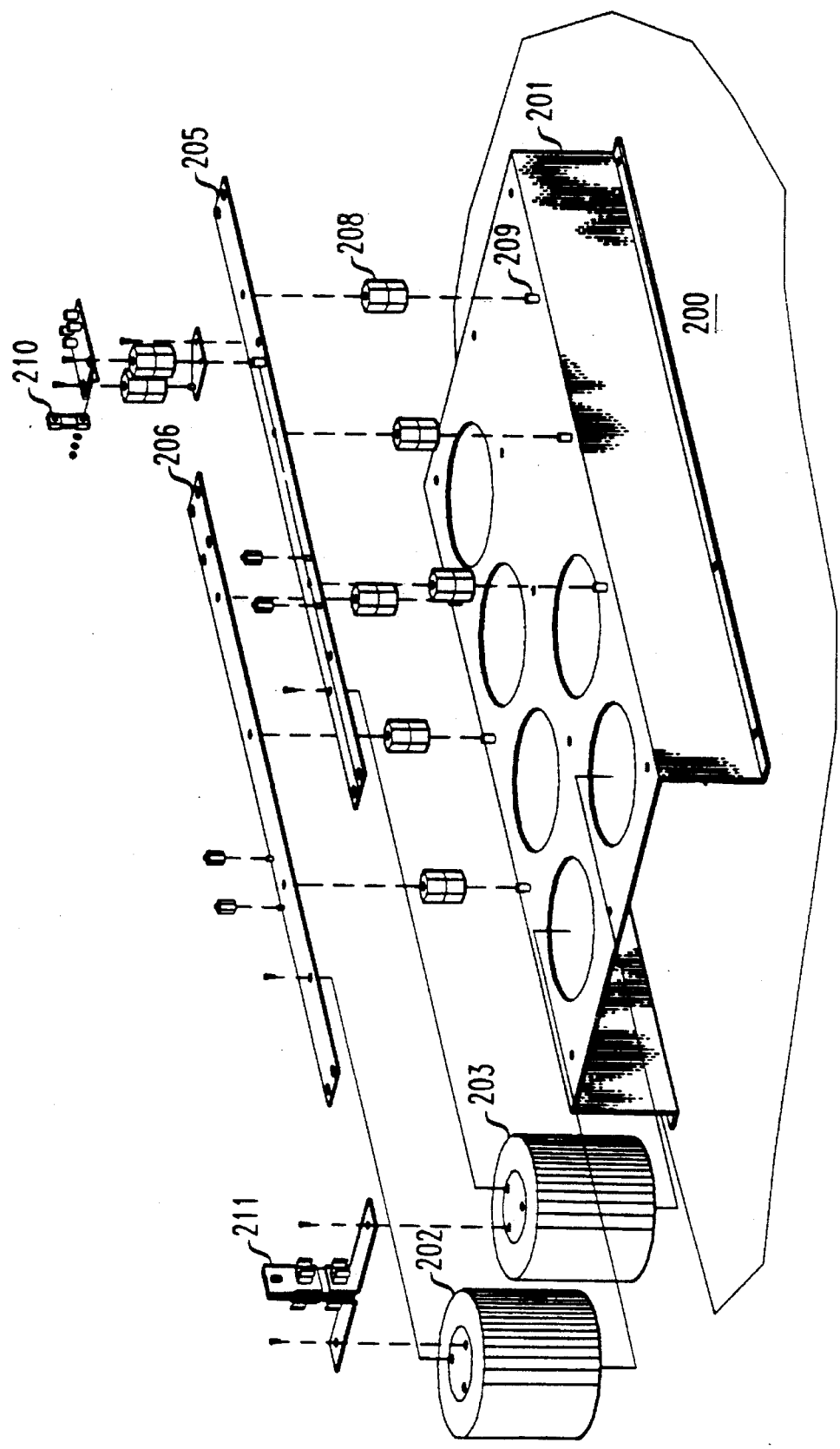
FIG. 2 is an exploded view of the assembled mount and the ancillary components including the capacitors and bus bars and mounting components for securing to the power system assembly.

A typical assembly including the capacitors to be mounted on a power system substrate is shown in the FIG. 2. The mounting assembly 201 comprising the above described members is shown mounted on a portion of a substrate 200 (shown in fragmentary form). A pair of capacitors 202 and 203 are shown prior to insertion to the supporting apertures of the mounting assembly 201. While only two capacitors are shown typically all the apertures are used to support capacitors. A pair of bus bars 205 and 206 interconnects the capacitor terminals to each other and to the circuitry of the power system. These bus bars are secured to the mounting assembly by insulated standoffs 208 affixed to the pem studs 209. A shunt 210 is connected to one end of the bus bars and a fuse bracket 211 is connected to the other end.

Figure 3:
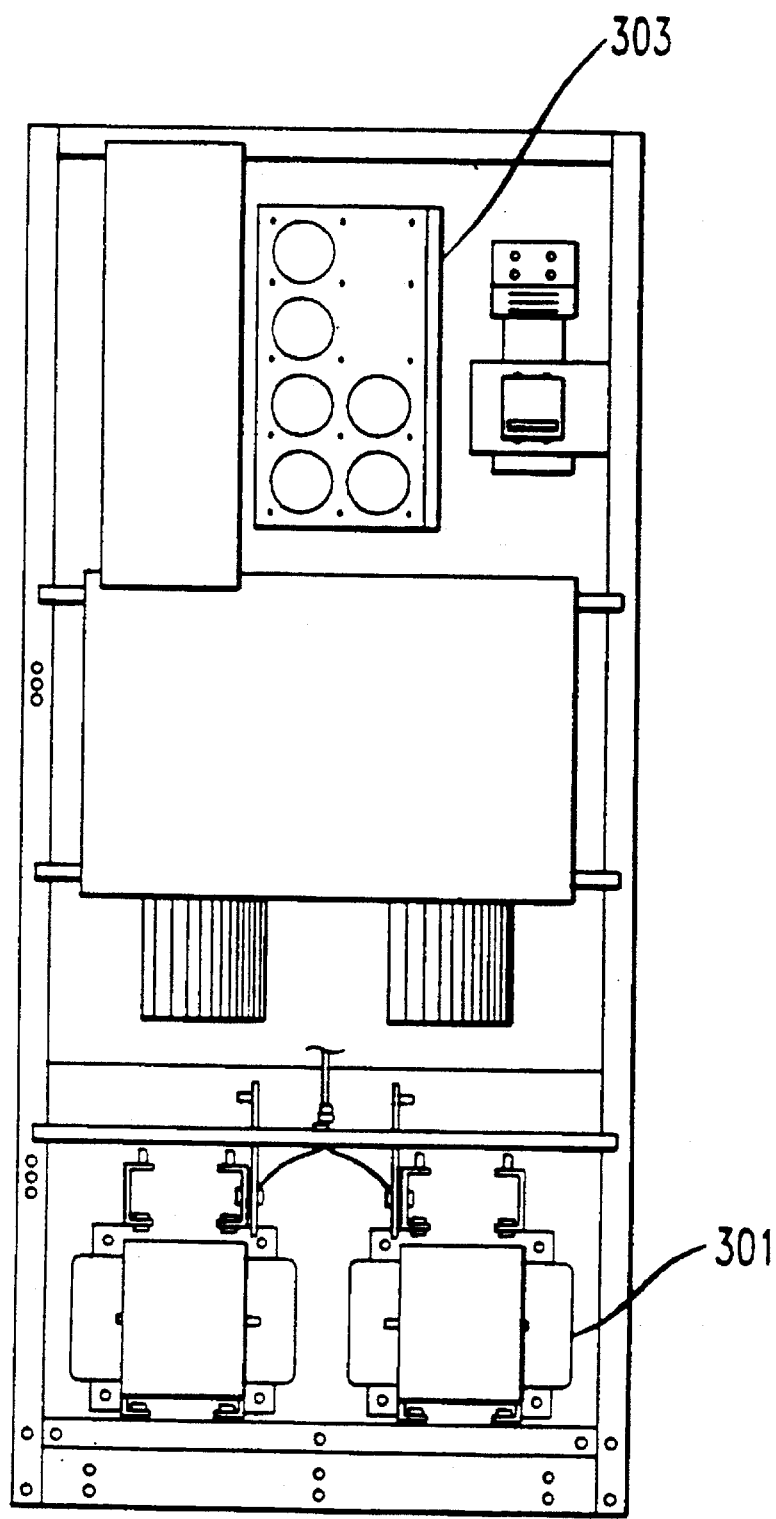
FIG. 3 is a planar view of a power supply system to which the mounting assembly is applied.

A power system to which the mounting may be applied is shown in plan view in FIG. 3. The circuitry is supported by a circuit structure. The transformers 301 are mounted near the bottom. The capacitor mounting system 303 is located near the top of the overall structure. Typically a centrally located bus (not shown in its entirety) interconnects the components of the power circuit including the transformers and the capacitors.

We claim:

1. A can capacitor mounting assembly for securing and aligning capacitors to a power system apparatus; comprising:

a support base having a channel cross section and including longitudinal flanges with holes for allowing insertion of fastening devices to secure the support base to the power system apparatus;

the support base having a top planar surface with a plurality of circular apertures for accepting the can capacitors;

a flexible sheet layer positioned on top of the top planar surface;

a third layer positioned on top of the flexible sheet layer;

the flexible sheet layer and the third layer each having circular apertures which are in register with the plurality of circular apertures in the support base and the circular apertures in the flexible sheet having flexible tabs about the inner circumference of each of the circular apertures to provide an interference fit with can capacitors inserted into the circular apertures.

2. A can capacitor mounting assembly as claimed in claim 1, wherein the flexible sheet layer includes a layer of a polypropylene material.

3. A can capacitor mounting assembly as claimed in claim 1, wherein the support base includes pem studs and the flexible sheet layer and the third layer have holes to fit over the pem studs so that the support base, flexible layer and the third layer are properly aligned so that the circular apertures are in register.

4. A can capacitor mounting assembly as claimed in claim 1, further including first and second bus bars mounted on the support base and electrically interconnecting the capacitors to each other and to power circuitry.

5. A can capacitor mounting assembly as claimed in claim 1, wherein the support base and third layer are formed from a metallic sheet.

* * * * *